(12) United States Patent
Gouko

(10) Patent No.: US 8,671,420 B2
(45) Date of Patent: Mar. 11, 2014

(54) MANUFACTURING METHOD OF OPTICAL INFORMATION RECORDING MEDIUM AND OPTICAL INFORMATION RECORDING MEDIUM

(75) Inventor: Takeshi Gouko, Miyagi (JP)

(73) Assignee: Sony Corporation, Tokyo (JP)

( * ) Notice: Subject to any disclaimer, the term of this patent is extended or adjusted under 35 U.S.C. 154(b) by 117 days.

(21) Appl. No.: 13/354,759

(22) Filed: Jan. 20, 2012

(65) Prior Publication Data
US 2012/0201117 A1 Aug. 9, 2012

(30) Foreign Application Priority Data

Feb. 3, 2011 (JP) ................................. 2011-022180

(51) Int. Cl.
*G11B 7/24* (2013.01)
(52) U.S. Cl.
USPC ......................................................... 720/718
(58) Field of Classification Search
USPC ......................................................... 720/718
See application file for complete search history.

(56) References Cited

U.S. PATENT DOCUMENTS

| | | | | |
|---|---|---|---|---|
| 5,381,401 | A * | 1/1995 | Best et al. | 369/275.1 |
| 6,862,740 | B2 * | 3/2005 | Yasuda et al. | 720/718 |
| 6,954,941 | B2 * | 10/2005 | Miyamoto et al. | 720/718 |
| 7,096,479 | B2 * | 8/2006 | Akutsu et al. | 720/718 |
| 7,276,274 | B2 * | 10/2007 | Inoue et al. | 428/64.4 |
| 7,353,528 | B2 * | 4/2008 | Hayashibe et al. | 720/718 |
| 7,761,887 | B2 * | 7/2010 | Kim et al. | 720/718 |
| 7,835,257 | B2 * | 11/2010 | Hagiwara et al. | 369/275.3 |
| 7,933,185 | B2 * | 4/2011 | Hirokane et al. | 369/94 |
| 8,339,918 | B2 * | 12/2012 | Kikukawa et al. | 369/59.22 |

FOREIGN PATENT DOCUMENTS

| | | |
|---|---|---|
| JP | 2003-173571 | 6/2003 |
| JP | 2003-338084 | 11/2003 |
| JP | 3991790 | 10/2007 |

* cited by examiner

*Primary Examiner* — Mark Blouin
(74) *Attorney, Agent, or Firm* — K&L Gates LLP

(57) ABSTRACT

A manufacturing method of an optical information recording medium includes forming a substrate which has a first main surface and a second main surface, forming a first information signal layer on the first main surface of the substrate, forming an intermediate layer on the first information signal layer, forming a second information signal layer on the intermediate layer, irradiating light from the second main surface side of the substrate and recording identification information on a first region out of the first region and a second region, and forming a barrier layer with regard to the second main surface in the second region which excludes the first region where the identification information is recorded before the recording of the identification information.

13 Claims, 9 Drawing Sheets

14  12  13

MANUFACTURING METHOD OF OPTICAL INFORMATION RECORDING MEDIUM AND OPTICAL INFORMATION RECORDING MEDIUM

CROSS REFERENCES TO RELATED APPLICATIONS

The present application claims priority to Japanese Priority Patent Application JP 2011-022180 filed in the Japan Patent Office on Feb. 3, 2011, the entire content of which is hereby incorporated by reference.

BACKGROUND

The present disclosure relates to a manufacturing method of an optical information recording medium and an optical information recording medium. In further detail, the present disclosure relates to a manufacturing method of an optical information recording medium which is provided with a plurality of information signal layers.

In recent years, there is a wide range of copyright protection techniques in reproduction-only DVDs (DVD-ROM: Digital Versatile Disc-Read Only Memory), recording DVDs, and the like. As one technique, there is the encrypting of content data which is recorded using a media ID by unique binary information being recorded on a medium which is known as media ID in the innermost circumference side area (Burst Cutting Area: BCA) in a state where there is no recording on the disc.

In addition, also in a high-density optical information recording medium such as a Blu-ray disc (registered trademark) (BD), recording of a mark in a bar-code form which is binary information (referred to below as a BCA mark) in the BCA is proposed.

Typically, the BCA mark is recorded after manufacturing of the optical information recording medium. For example, the recording of the BCA mark is performed after the forming of a substrate, the depositing of an information signal film, and the forming of an intermediate layer and a cover layer have been sequentially performed. In the initial state of the optical information recording medium, the information signal film is in a non-recording state and is set to a recording state by irradiation of laser light being performed only in a necessary portion corresponding to the BCA mark. At this time, the laser light is typically irradiated from a surface side which is a side where the information signal film of the substrate is not formed.

In the resin substrate of the optical information recording medium, since the moisture distribution in the substrate is not uniform due to changes in temperature or the like and there is expansion where there is high level of moisture content, warping of the optical information recording medium occurs. With regard to this, a technique is disclosed in Japanese Unexamined Patent Application Publication 2003-3380842 where the entry and exit of moisture to and from the substrate is prevented by a moisture impermeable film (moisture exclusion film) being provided on one main surface of the substrate.

SUMMARY

In the optical information recording medium, since skew characteristics are secured, forming of a moisture exclusion film is performed on a main surface (a main surface on a side where the information signal film is not formed) of the substrate. The moisture exclusion film is formed in the BCA. Accordingly, in order to avoid the recording of the BCA mark being difficult, the recording of the BCA mark is performed after the information signal film, the intermediate film, the cover film, and the like are sequentially formed on one of the main surfaces of the substrate, and after that, the moisture exclusion film is formed on the other main surface (the main surface on a side where the information signal film is not formed) of the substrate.

However, in the depositing process of the information signal film, if moisture in the resin substrate is released into a vacuum sputtering device used for the depositing of the information signal film, the recording characteristics and the like of the information signal film are reduced. In order to prevent this, it is preferable that the formation of the moisture exclusion film with regard to the main surface of the substrate be performed before the depositing of the information signal film.

However, it is difficult to perform the formation of the moisture exclusion film before the depositing of the information signal film. This is because, since the moisture exclusion film is also formed in the BCA, when the moisture exclusion film is formed before the recording of the BCA mark, it may be necessary that the laser light for the BCA mark recording, which is irradiated from the rear surface side of the substrate, is transmitted through the moisture exclusion film and performs the recording with regard to the information signal film when recording the BCA mark, and as a result, the recording of the BCA mark becomes difficult due to insufficient transmittance of the laser light. On the other hand, if the formation of the moisture exclusion film is performed after the formation of the information signal layer, various characteristics such as the recording characteristics of the information signal film are reduced as described above.

Accordingly, it is desirable to provide a manufacturing method of an optical information recording medium and an optical information recording medium which are able to improve characteristics such as recording characteristics.

According to a first embodiment of the present disclosure, a manufacturing method of an optical information recording medium includes forming a substrate which has a first main surface and a second main surface, forming a first information signal layer on the first main surface of the substrate, forming an intermediate layer on the first information signal layer, forming a second information signal layer on the intermediate layer, irradiating light from the second main surface side of the substrate and recording identification information on a first region out of the first region and a second region, and forming a barrier layer with regard to the second main surface in the second region which excludes the first region where the identification information is recorded before the recording of the identification information.

According to a second embodiment of the present disclosure, an optical information recording medium is provided with a substrate which has a first main surface and a second main surface, one or a plurality of information signal layers which are formed on the first main surface of the substrate and where identification information is recorded, and a barrier layer which is formed on the second main surface, where the barrier layer is formed in a second region which excludes a first region where the identification information is recorded.

In the first embodiment and the second embodiment of the present disclosure, the barrier layer is formed in the second region which excludes the first region where the identification information is recorded. Due to this, it is possible to form the barrier layer before the recording the identification information is recorded, and improving of characteristics such as recording characteristics is possible.

According to the embodiments of the present disclosure, improving of characteristics such as recording characteristics is possible.

Additional features and advantages are described herein, and will be apparent from the following Detailed Description and the figures.

DETAILED DESCRIPTION

Below, the embodiments of the present disclosure will be described with reference to the drawings. Here, the description will be described in the following order.
1. First Embodiment (Optical Information Recording Medium)
2. Other Embodiments (Modified Examples)

1. First Embodiment

Configuration of Optical Information Recording Medium

Figure 1A:
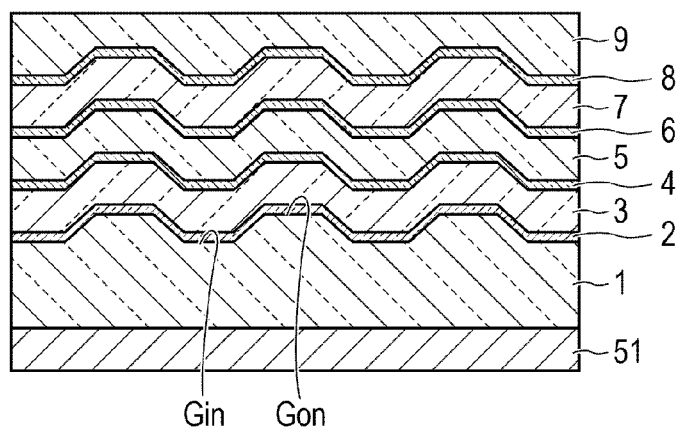
FIGS. 1A and 1B are cross-sectional diagrams illustrating a configuration example of an optical information recording medium according to an embodiment of the present disclosure.
Figure 1B:
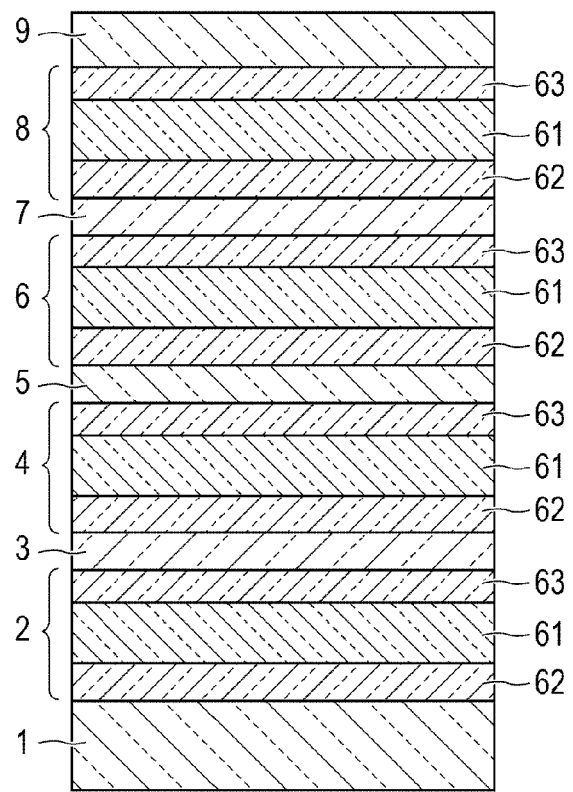

FIGS. 1A and 1B illustrate a configuration example of an optical information recording medium according to a first embodiment of the present disclosure. The optical information recording medium is, for example, an recordable optical information recording medium, and is provided with a first information signal layer 2 (L0 layer), a first intermediate layer 3, a second information signal layer 4 (L1 layer), a second intermediate layer 5, a third information signal layer 6 (L2), a third intermediate layer 7, a fourth information signal layer 8 (L3 layer), and a cover layer 9 which are sequentially laminated on one main surface of a substrate 1, and a barrier layer 51 which is laminated on the other main surface of the substrate 1 as shown in FIG. 1A. Here, the other main surface which is on a side opposite to the one main surface of the substrate where the first information signal layer 2, the first intermediate layer 3, the second information signal layer 4, the second intermediate layer 5, the third information signal layer 6, the third intermediate layer 7, the fourth information signal layer 8, and the cover layer 9 are sequentially laminated is arbitrarily referred to as the rear surface.

Figure 2:
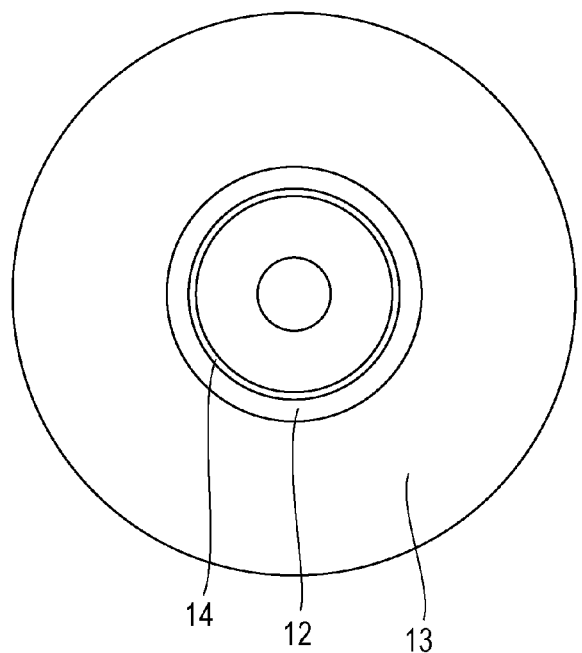
FIG. 2 is a planar diagram illustrating a configuration of an optical information recording medium according to an embodiment of the present disclosure.

FIG. 2 is a planar diagram illustrating an optical information recording medium according to the first embodiment of the present disclosure. A lead-in region 12 is provided in an inner circumference portion of the optical information recording medium and a data recording region 13 is provided at the outer circumference side of the lead-in region 12. In addition, a BCA (Burst Cutting Area) 14 which is an identification information recording region is provided in the lead-in region 12.

The BCA 14 is typically provided in a region with an annular shape where the radius r is 21.0 mm to 22.0 mm. Here, the radius r is a radius from the center of the main surface of the substrate 1. The BCA 14 is an annular region which is set for recording identification information when manufacturing the optical information recording medium and is typically set in an innermost circumference side of the optical recording medium. The identification information is information which is unique for each medium, and for example, is desirable to prevent fraudulent copying or the like. For example, a BCA mark in a bar-code form is recorded in the first information signal layer 2 in the BCA 14. Although the details will be described later, the recording of the BCA mark is performed with regard to the first information signal layer 2 by laser light being irradiated from the rear surface side of the substrate 1 after the first information signal layer 2, the first intermediate layer 3, the second information signal layer 4, the second intermediate layer 5, the third information signal layer 6, the third intermediate layer 7, the fourth information signal layer 8, and the cover layer 9 are sequentially formed on one of the main surfaces of the substrate 1 after the forming of the substrate 1. The forming of the barrier layer 51 which is formed on the rear surface of the substrate 1 is typically performed after the forming of the substrate 1 and before the forming of the first information signal layer 2 or after the forming of the first information signal layer 2 and before the forming of the first intermediate layer 3.

The data recording region 13 is a region for a user to record necessary data. The data recording region 13 is typically provided where the radius r is 23.2 mm to 58.5 mm. For example, a sine-wave wobble groove is formed in the data recording region 13. The track pitch is typically 320 nm and this is because it is possible to obtain a high capacity where it is possible to record and reproduce for a longer period of time due to the pitch being compressed. Here, the actual recording of the data is typically further to the outer circumference side than where the radius r is 24.0 mm.

The lead-in region 12 is, for example, a region for recording information such as identification information (ID), an encryption key, and a composite key, and the information is recorded when manufacturing the optical information recording medium. The lead-in region 12 is further divided into, for example, a PIC (Permanent Information & Control Data) region, an OPC (Optimum Power Control) region, and an INFO region.

The PIC region is a reproduction-only region, and for example, is provided where the radius r is 22.4 mm to 23.197 mm. For example, a groove track which is formed from an arrangement of rectangular wobble grooves is formed in the PIC region with a track pitch of 350 nm. The information is reproduced from the arrangement of the rectangular wobble grooves.

In the optical information recording medium, recording and reproduction of the information signal is performed by the laser light being irradiated on the first information signal layer 2, the second information signal layer 4, the third information signal layer 6, or the fourth information signal layer 8 from the cover layer 9 side. For example, recording and reproduction of the information signal is performed by the laser light which has a wavelength of 400 nm to 410 nm being collected by an object lens which has a numerical aperture of 0.84 to 0.86 and irradiated on the first information signal layer 2, the second information signal layer 4, the third information signal layer 6, or the fourth information signal layer 8 from the cover layer 9 side. As the optical information recording medium such as this, for example, there is a recordable optical information recording medium such as a BD-R.

Below, the substrate 1, the first information signal layer 2, the first intermediate layer 3, the second information signal layer 4, the second intermediate layer 5, the third information signal layer 6, the third intermediate layer 7, the fourth information signal layer 8, the cover layer 9, and the barrier layer 51 which configure the optical information recording medium will be sequentially described.

(Substrate)

The substrate 1 has an annular shape where an opening is formed in the center (referred to below as a center hole). One main surface of the substrate 1 has, for example, concave and convex surfaces, and the first information signal layer 2 is deposited on the concave and convex surfaces. Below, out of the concave and convex surface, a concave portion is referred to as an in groove Gin and a convex portion is referred to as an on groove Gon.

As the shapes of the in groove Gin and the on groove Gon, for example, there are various shapes such as a spiral shape or a concentric circular shape. In addition, the in groove Gin and/or the on groove Gon is, for example, a wobble (meandering) for adding the address information.

The diameter of the substrate 1 is selected to be, for example, 120 mm. The thickness of the substrate 1 is selected in consideration of rigidity, is preferably selected from 0.3 mm or more to 1.3 mm or less, is more preferably selected from 0.6 mm or more to 1.3 mm or less, and for example, 1.1 mm is selected. In addition, the diameter of the center hole is selected to be, for example, 15 mm.

The substrate 1 includes, for example, a plastic resin material which has water absorbing properties as a main component. As the material of the substrate 1, for example, it is possible to use a resin material such as a polycarbonate series resin or an acrylic resin.

(Information Signal Layer)

FIG. 1B is a model diagram illustrating one configuration example of each information signal layer shown in FIG. 1A. As shown in FIG. 1B, the first information signal layer 2 to the fourth information signal layer 8 are provided with, for example, an inorganic recording layer 61, a first protective layer 62 which is provided to be adjacent to one main surface of the inorganic recording layer 61, and a second protective layer 63 which is provided to be adjacent to the other main surface of the inorganic recording layer 61. By having such a configuration, it is possible to improve the durability of the inorganic recording layer 61.

The inorganic recording layers 61, at least one layer of the first information signal layer 2 to the fourth information signal layer 8, includes a ternary oxides of a W oxide, a Pd oxide, and a Cu oxide as a main component. Due to this, it is possible for the characteristics which are necessary for as the information signal layer of the optical information recording medium are satisfied and superior transmitting characteristics to be realized. Here, as the characteristics which are necessary as the information signal layer of the optical information recording medium, there are excellent signal characteristics, a high recording power margin, high reproduction durability, suppression of changes in transmittance after recording, and the like.

It is preferable that the inorganic recording layers 61, at least one layer of the first information signal layer 2 to the fourth information signal layer 8, includes a quaternary-based oxide where a Zn oxide is further added to the ternary oxides described above as a main component. Due to this, it is possible that the characteristics which are necessary as the optical information recording medium be satisfied and superior transmitting characteristics be realized as well as the contained amounts of the W oxide, the Pd oxide, and the Cu oxide being reduced. By reducing the contained amounts of the W oxide, the Pd oxide, and the Cu oxide, and in particular the Pd oxide, it is possible to reduce the cost of the optical information recording medium.

As the first protective layer 62 and the second protective layer 63, it is preferable that a dielectric layer or a transparent conducting layer is used, and it is possible to use a dielectric layer as one and a transparent conducting layer as the other out of the first protective layer 62 and the second protective layer 63. It is possible to improve the durability of the inorganic recording layer 61 by the dielectric layer or the transparent conducting layer functioning as an oxide barrier layer. In addition, by suppressing the escaping of oxygen of the inorganic recording layer 61, it is possible to suppress the change in the film substance of the recording film (detected mainly as a reduction in the reflection rate) and it is possible to secure a film substance which is necessary as the inorganic recording layer 61. Furthermore, it is possible to improve the recording characteristics by providing the dielectric layer or the transparent conducting layer. This is considered to be because it is possible to optimize the forming of bubbles when recording by the heat dispersion of the laser light which is incident on the dielectric layer or the transparent conducting layer being optimized and the bursting of the bubbles due to the bubbles becoming too big in a recording portion or the decomposition of the Pd oxide excessively progressing being suppressed.

As the material of the first protective layer 62 and the second protective layer 63, for example, there are oxides, nitrides, sulfides, carbides, and fluorides, or a combination thereof As the material of the first protective layer 62 and the second protective layer 63, it is possible to use materials which are different from each other or which are the same as each other. As the oxides, for example, there are oxides of one or more of the elements which are selected from a group of In, Zn, Sn, Al, Si, Ge, Ti, Ga, Ta, Nb, Hf, Zr, Cr, Bi, and Mg. As the nitrides, for example, there are nitrides of one or more of the elements which are selected from a group of In, Sn, Ge, Cr, Si, Al, Nb, Mo, Ti, W, Ta, and Zn, and preferably nitrides of one or more of the elements which are selected from a group of Si, Ge, and Ti. As the sulfides, for example, there is Zn sulfide. As the carbides, for example, there are carbides of one or more of the elements which are selected from a group of In, Sn, Ge, Cr, Si, Al, Ti, Zr, Ta, and W, and more preferably carbides of one or more of the elements which are selected from a group of Si, Ti, and W. As the fluorides, for example, there are fluorides of one or more of the elements which are selected from a group of Si, Al, Mg, Ca, and La. As the combinations thereof, for example, there are $ZnS—SiO_2$, $SiO_2—In_2O_3—ZrO_2$ (SIZ), $SiO_2—Cr_2O_3—ZrO_2$ (SCZ), $In_2O_3—SnO_2$ (ITO), $In_2O_3—CeO_2$ (ICO), $In_2O_3—Ga_2O_3$ (IGO), In$_2$O$_3$—Ga$_2$O$_3$—ZnO (IGZO), Sn$_2$O$_3$—Ta$_2$O$_5$ (TTO), TiO$_2$—SiO$_2$, or the like.

(Intermediate Layer)

As the material of the first intermediate layer 3, the second intermediate layer 5, and the third intermediate layer 7, for example, it is possible to use a resin material which has transparency properties. As a resin material such as this, for example, it is possible to use a plastic material such as a polycarbonate series resin, polyolefin series resin, acrylic resin, or the like. The surfaces of the cover layer 9 sides of the first intermediate layer 3 to the third intermediate layer 7 are concave and convex surfaces formed from the in groove Gin and the on groove Gon in the same manner as the substrate 1.

(Cover Layer)

The cover layer 9 which is a protective layer is, for example, a resin layer where a light sensitive resin such as an ultraviolet curable resin is cured. As the material of the resin layer, for example, there is an ultraviolet curing type of acrylic resin. In addition, a cover layer may be configured from an optically transparent sheet which is an annular shape and an adhesive layer for bonding the optically transparent sheet with regard to the substrate 1. It is preferable that the optically transparent sheet be formed from a material with a low absorbance capacity with regard to the laser light which is used in recording and reproduction, and specifically, it is preferably formed from a material with transmittance rate of 90% or more. As the material of the optically transparent sheet, for example, there is a polycarbonate series resin material and a polyolefin resin (for example, Zeonex (registered trademark)). The thickness of the optically transparent sheet is preferably selected to be 0.3 mm or less, and is more preferably selected to be in the range of 3 µm to 177 µm. The adhesive layer is, for example, formed from an ultraviolet curable resin or a pressure sensitive adhesive (PSA).

The thickness of the cover layer 9 is preferably selected from a range of 10 µm to 177 µm, and for example, 100 µm is selected. By the cover layer 9 which is as thin as this and, for example, an object lens which has a high numerical aperture of approximately 0.85 being combined, it is possible to realize high density recording.

(Hard Coating Layer)

A hard coating layer may be formed on the cover layer 9. The hard coating layer is for applying scratch resistance or the like to the optical irradiation surface. As the material of the hard coating layer, for example, it is possible to use an acrylic resin, a silicon resin, a fluorine resin, an organic-inorganic hybrid resin, or the like.

(Barrier Layer)

The barrier layer 51 suppresses the discharge of gas (release of moisture) from the rear surface of the substrate 1 in the depositing process. In addition, the barrier layer 51 also functions as a moisture exclusion layer which suppresses the absorption of moisture at the rear surface of the substrate 1.

The material which configures the barrier layer 51 is not particularly limited as long as it is able to suppress the discharge of gas (release of moisture) from the rear surface of the substrate 1, but if exemplified, it is possible to use a dielectric with low gas transmittance. As a dielectric such as this, for example, it is possible to use at least one type of SiN, SiO$_2$, TiN, MN, and ZnS—SiO$_2$.

It is preferable if the moisture transmittance of the barrier layer 51 is 5×10$^{-5}$ g/cm$^2$·day or less. It is preferable that the thickness of the barrier layer 51 be set to be 5 nm or more and 40 nm or less. When less than 5 nm, there is a tendency for the barrier function which suppresses the discharge of gas from the rear surface of the substrate to be reduced. On the other hand, when more than 40 nm, the barrier function which suppresses the discharge of gas does not significantly change in a case of a thickness which is equal to or less than this and there is a tendency for there to be a reduction in productivity.

Figure 3:
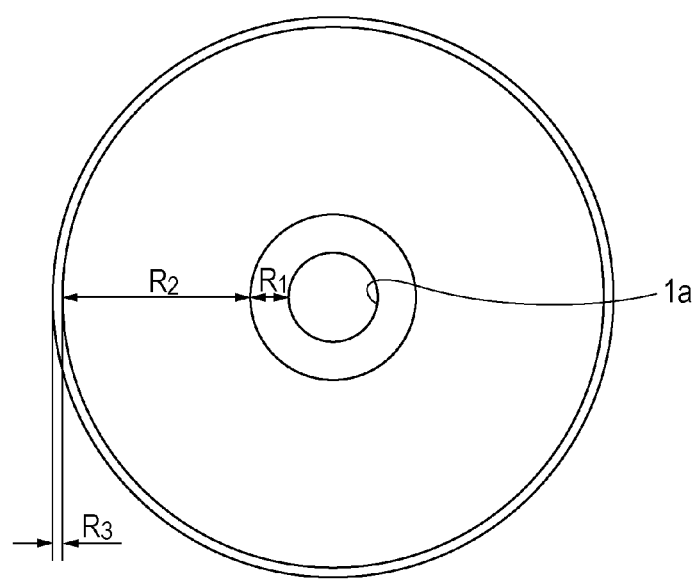
FIG. 3 is a planar diagram illustrating a deposition area of a barrier layer which is formed on a rear surface of a substrate according to an embodiment of the present disclosure.

FIG. 3 is a planar diagram illustrating a depositing region of the barrier layer 51 which is formed on the rear surface of the substrate 1. As described above, a center hole 1a is formed in a center portion of the substrate 1. In the rear surface of the substrate 1, a substrate exposure area R$_1$ at an inner circumference side, a deposition area R$_2$ for the barrier layer 51, and a substrate exposure area R$_3$ at an outer circumference side are provided from the inner circumference toward the outer circumference of the substrate 1. The deposition area R$_2$ for the barrier layer 51 is adjusted using an inner circumference mask and an outer circumference mask which respectively cover an inner circumference portion and an outer circumference portion of the substrate 1 in the depositing process of the barrier layer 51 which will be described later. By covering the inner circumference portion and the outer circumference portion of the substrate 1 using the inner circumference mask and the outer circumference mask, the substrate exposure area R$_1$ at the inner circumference side and the substrate exposure area R$_3$ at the outer circumference side where the substrate 1 is exposed are formed without the barrier layer 51 being formed.

The barrier layer 51 is formed in a region on the rear surface of the substrate 1 which excludes the BCA 14. That is, in order to improve the recording characteristics and the like of the information signal layer, the forming of the barrier layer 51 with regard to the rear surface of the substrate 1 is performed, for example, after the depositing of the first information signal layer 2 and before the recording of the BCA mark such as before the depositing of the second information signal layer 4 and the like. Accordingly, when the barrier layer 51 is formed in the BCA 14 on the rear surface of the substrate 1, it is necessary that the laser light for recording the BCA mark when the BCA mark is recorded perform recording with regard to the first information signal layer 2 by being transmitted through the barrier layer 51, and as a result, the recording of the BCA mark becomes difficult due to insufficient transmittance of the laser light and the like. In order to avoid this, the barrier layer 51 is formed in a region on the rear surface of the substrate 1 which excludes the BCA 14.

Specifically, the BCA 14 is excluded from the deposition area R$_2$ for the barrier layer 51. That is, the deposition area R$_2$ with the annular shape of the barrier layer 51 is set in an outer side of the BCA 14 and the substrate exposure area R$_3$ with an annular shape is set further to the outer side. Here, it is sufficient if the substrate exposure area R$_3$ is not set.

As described above, since the BCA 14 is typically formed in an annular region where the radius r is 21 mm or more and 22 mm or less, a start position at an inner circumference side of the deposition area R$_2$ with the annular shape typically is where r>22 mm. Furthermore, when considering the point that superior sudden change characteristics are able to be obtained, it is preferable that the start position at an inner circumference side of the deposition area R$_2$ be where 22 mm<r<25 mm.

(Manufacturing Method of Optical Information Recording Medium)

Figure 4:
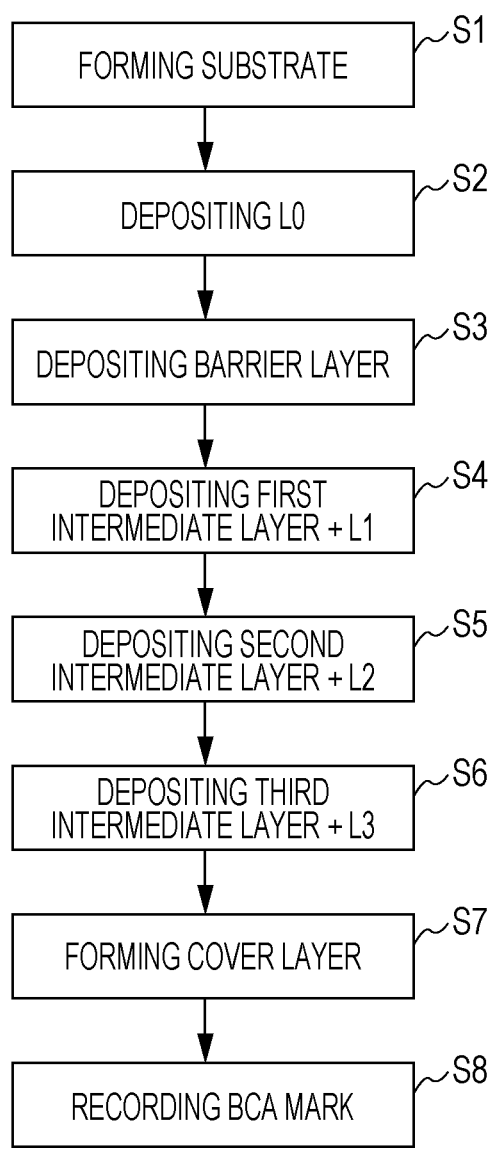
FIG. 4 is a flowchart for describing a first example of a manufacturing process of an optical information recording medium.

Next, a first example and a second example of a manufacturing method of the optical information recording medium which has the configuration described above will be described. First, the first example of the manufacturing method of the optical information recording medium will be described while referencing the flowchart of FIG. 4.

First Example

First, in step S1, the substrate 1 is formed, for example, by a forming device such as an injection molding device. Next, the substrate 1 which has been formed is transported from the forming device to a L0 layer deposition device.

Next, in step S2, the first information signal layer 2 (L0 layer) is formed in the L0 layer deposition device. It is preferable that the L0 layer deposition device is a single wafer deposition device. This is because each layer (for example, the first protective layer 62, the inorganic recording layer 61, and the second protective layer 63) which configures the first information signal layer 2 is able to be continuously laminated sequentially on the substrate 1 without breaking the vacuum using each of the vacuum chambers of the single wafer deposition device. As the single wafer deposition device, for example, it is possible to use an application of a vacuum thin film formation technique such as a sputtering method or a vacuum deposition method. As the sputtering method, it is possible to use, for example, a radio frequency (RF) sputtering method or a direct current (DC) sputtering method, but the direct current sputtering method is particularly preferable. This is because, since the deposition rate of the direct current sputtering method is high compared to the radio frequency sputtering method, it is possible to improve the productivity. Next, the substrate 1 where the first information signal layer 2 is formed is transported from the L0 layer deposition device to the barrier layer deposition device.

Figure 5:
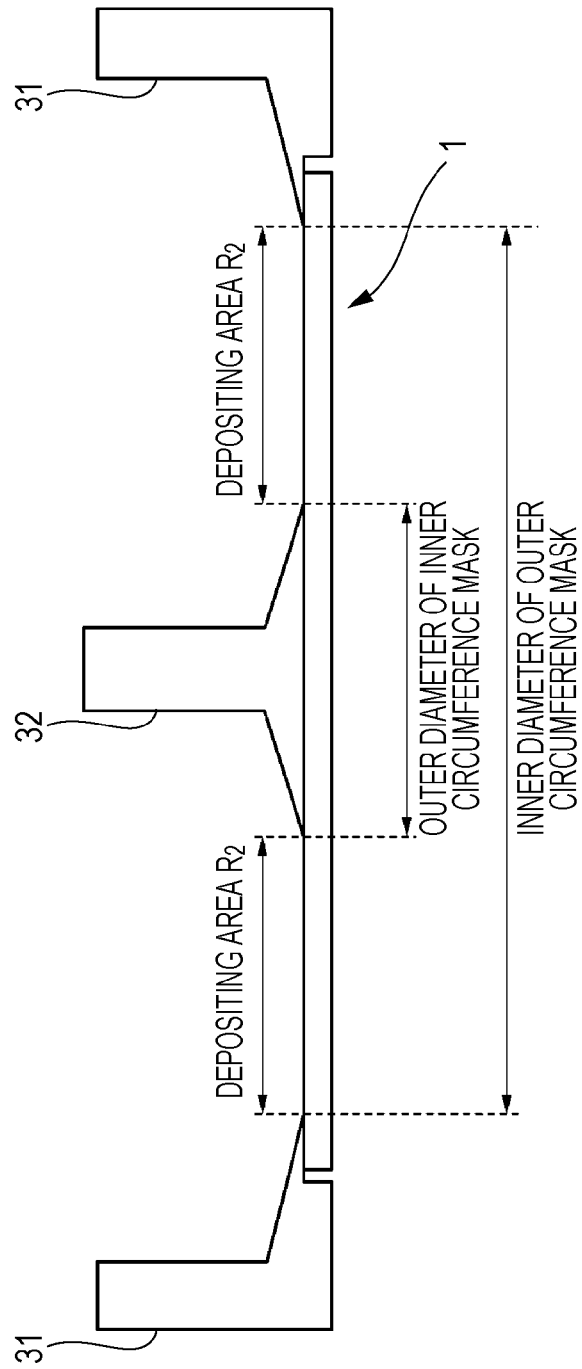
FIG. 5 is an outline diagram illustrating an example of an arrangement of an outer circumference mask and an inner circumference mask.

Next, in step S3, as shown in FIG. 5, the outer circumference portion and the inner circumference portion of the rear surface of the substrate 1 are respectively covered by an outer circumference mask 31 and the inner circumference mask 32 and the barrier layer 51 is formed on the rear surface of the substrate 1 in a barrier layer deposition device. At this time, the barrier layer 51 is formed in a predetermined region which is described with reference to FIG. 3. As the barrier layer deposition device, for example, it is possible to use an application of a vacuum thin film formation technique such as a sputtering method or a vacuum deposition method. Here, the L0 layer deposition device and the barrier layer deposition device may be integral and it may be possible to continuously deposit the first information signal layer 2 and the barrier layer 51 in the one deposition device. Next, the substrate 1 where the barrier layer 51 is formed is transported from the barrier layer deposition device to the intermediate layer forming device.

Next, in step S4, an ultraviolet curable resin is coated uniformly on the first information signal layer 2 using, for example, a spin coating method in the intermediate layer forming device. After that, a concave and convex pattern of a stamper is pressed with regard to the ultraviolet curable resin which is coated uniformly on the first information signal layer 2 and the stamper is separated after irradiating the ultraviolet curable resin with ultraviolet rays and curing thereof. Due to this, the concave and convex pattern of the stamper is transferred to the ultraviolet curable resin and, for example, the first intermediate layer 3 where the in groove Gin and the on groove Gon are provided is formed. Next, the substrate 1 where the first intermediate layer 3 is formed is transported from the intermediate layer forming device to an L1 layer deposition device.

Next, the second information signal layer 4 (L1 layer) is formed on the intermediate layer 3 in the L1 layer deposition device. It is preferable that the L1 layer deposition device be a single wafer deposition device. This is because, for example, each layer which configures the second information signal layer 4 is able to be continuously laminated sequentially on the intermediate layer 3 without breaking the vacuum using each of the vacuum chambers of the deposition device. As the single wafer deposition device, for example, it is possible to use an application of a vacuum thin film formation technique such as a sputtering method or a vacuum deposition method.

Next, in step S5, an ultraviolet curable resin is coated uniformly on the second information signal layer 4 using, for example, a spin coating method in the intermediate layer forming device. After that, a concave and convex pattern of a stamper is pressed with regard to the ultraviolet curable resin which is coated uniformly on the second information signal layer 4 and the stamper is separated after irradiating the ultraviolet curable resin with the ultraviolet rays and curing thereof Due to this, the concave and convex pattern of the stamper is transferred to the ultraviolet curable resin and, for example, the second intermediate layer 5 where the in groove Gin and the on groove Gon are provided is formed. Next, the substrate 1 which the second intermediate layer 5 is formed is transported from the intermediate layer forming device to an L2 layer deposition device.

Next, the third information signal layer 6 (L2 layer) is formed on the second intermediate layer 5 in the L2 layer deposition device. It is preferable that the L2 layer deposition device be a single wafer deposition device. This is because each layer which configures the third information signal layer 6 is able to be continuously laminated sequentially on the second intermediate layer 5 without breaking the vacuum using each of the vacuum chambers of the deposition device. As the single wafer deposition device, for example, it is possible to use an application of a vacuum thin film formation technique such as a sputtering method or a vacuum deposition method.

Next, in step S6, an ultraviolet curable resin is coated uniformly on the third information signal layer 6 using, for example, a spin coating method in the intermediate layer forming device. After that, a concave and convex pattern of a stamper is pressed with regard to the ultraviolet curable resin which is coated uniformly on the third information signal layer 6 and the stamper is separated after irradiating the ultraviolet curable resin with the ultraviolet rays and curing thereof Due to this, the concave and convex pattern of the stamper is transferred to the ultraviolet curable resin and, for example, the third intermediate layer 7 where the in groove Gin and the on groove Gon are provided is formed. Next, the substrate 1 which the third intermediate layer 7 is formed is transported from the intermediate layer forming device to an L3 layer deposition device.

Next, the fourth information signal layer 8 (L3 layer) is formed on the third intermediate layer 7 in the L3 layer deposition device. It is preferable that the L3 layer deposition device be a single wafer deposition device. This is because each layer which configures the fourth information signal layer 8 is able to be continuously laminated sequentially on the third intermediate layer 7 without breaking the vacuum using each of the vacuum chambers of the deposition device. As the single wafer deposition device, for example, it is possible to use an application of a vacuum thin film formation technique such as a sputtering method or a vacuum deposition method. Next, the substrate 1 which the L3 layer is formed is transported from the L3 layer deposition device to a cover layer forming device.

Next, in step S7, the cover layer 9 which is a protective layer is formed on the fourth information signal layer 8 in the cover layer forming device. As the cover layer forming device, it is possible to use a device which forms the cover layer 9, for example, by a light sensitive resin such as an ultraviolet curable resin being spin coated on the fourth information signal layer 8 and light such as ultraviolet rays being irradiated on the light sensitive resin. In addition, it is possible to use a device which forms the cover layer 9 by bonding a light transmitting sheet on the concave and convex surface side of the substrate 1 using an adhesive agent. Specifically, for example, it is possible to use a device which forms the cover layer 9 by bonding the light transmitting sheet to the concave and convex surface side of the substrate 1 using a light sensitive resin such as ultraviolet curable resin which is applied to the fourth information signal layer 8. In addition, it is possible to use a device which forms the cover layer 9 by bonding a light transmitting sheet to the concave and convex surface side of the substrate 1 using a pressure sensitive adhesive (PSA) which is coated uniformly in advance on a main surface of the sheet.

After this, in step S8, the recording of the BCA mark is performed. Below, the recording process of the BCA mark will be described. First, the optical information recording medium where until the cover layer 9 is formed is placed on a turntable so that a side of the substrate 1 (the rear surface side of the substrate 1) opposes an optical pickup. Next, the optical information recording medium is rotated at a predetermined speed driven by a motor.

Then, after the optical pickup is moved until the BCA 14 which is provided at an inner circumference portion of the optical information recording medium, the optical pickup is driven and, for example, laser light which is modulated to pulse form is irradiated from the substrate 1 side according to the identification information. Due to this, in the portion out of the first information signal layer 2 where the laser light is irradiated, each layer, which configures the first information signal layer 2 which are laminated on the substrate 1, is melted and removed. As a result, the mark (BCA mark) according to the identification information is formed, for example, in a hard coating form and the identification information is recorded in the BCA 14.

Here, it is preferable that the laser light be near infrared laser light or infrared laser light, and for example, is laser light with a wavelength of 800 nm. In addition, it is preferable that the optical head scanning speed during laser light irradiation be 5 m/s to 9 m/s and the laser power be in the range of 3400 mW to 4000 mW. By being in this range, it is possible to suppress a sudden increase in reflectivity in the recording mark edge portion. Accordingly, it is possible to reduce noise in the reproduction signal of the identification information. Due to the process above, it is possible to obtain the optical information recording medium shown in FIG. 1.

Second Example

Figure 6:
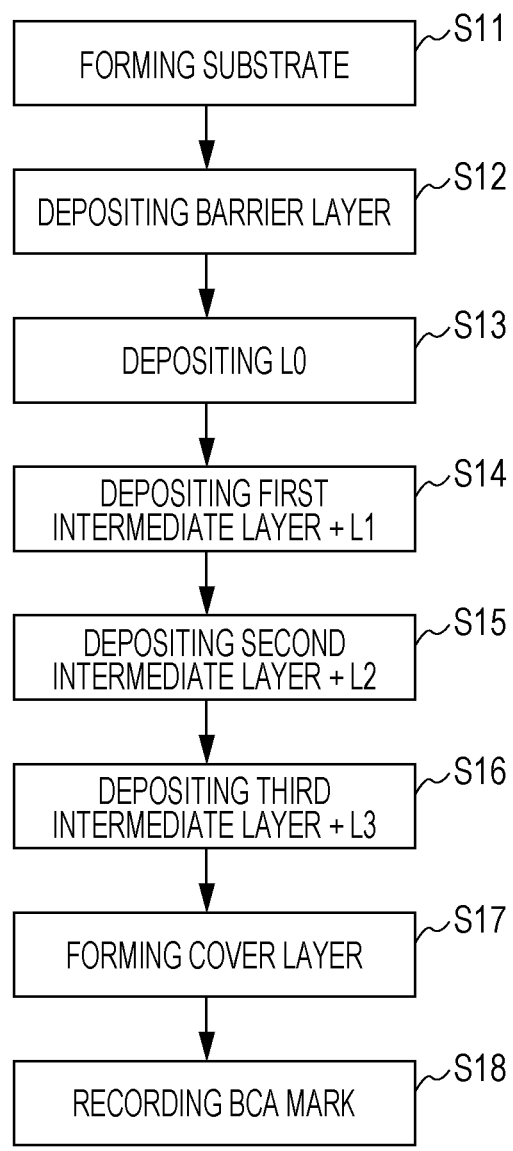
FIG. 6 is a flowchart for describing a second example of a manufacturing process of an optical information recording medium.

The second example of the manufacturing method of the optical information recording medium will be described while referencing the flowchart of FIG. 6.

First, in step S11, the substrate 1 is formed, for example, by a forming device such as an injection molding device.

Next, in step S12, as shown in FIG. 5, the outer circumference portion and the inner circumference portion on the rear surface of the substrate 1 are respectively covered by an outer circumference mask 31 and the inner circumference mask 32 and the barrier layer 51 is formed on the rear surface of the substrate 1 in a barrier layer deposition device. At this time, the barrier layer 51 is formed in a predetermined region which is described with reference to FIG. 3. Next, the substrate 1 which the barrier layer 51 is formed is transported from the barrier layer deposition device to the L0 layer deposition device. Here, the barrier layer deposition device and the L0 layer deposition device may be integral and it may be possible to continuously deposit the barrier layer 51 and the first information signal layer 2 in the one deposition device.

Next, in step S13, the first information signal layer 2 (L0 layer) is formed in the L0 layer deposition device. It is preferable that the L0 layer deposition device be a single wafer deposition device. This is because each layer which configures the first information signal layer 2 is able to be continuously laminated sequentially on the substrate 1 without breaking the vacuum using each of the vacuum chambers of the single wafer deposition device. As the single wafer deposition device, for example, it is possible to use an application of a vacuum thin film formation technique such as a sputtering method or a vacuum deposition method. Next, the substrate 1 where the first information signal layer 2 is formed is transported from the L0 layer deposition device to the intermediate layer forming device.

Next, in step S14, the forming of the first intermediate layer 3 and the depositing of the second information signal layer 4 (L1 layer) is performed in the same manner as step S4 of the first example, and in step S15, the forming of the second intermediate layer 5 and the depositing of the third information signal layer 6 (L2 layer) is performed in the same manner as step S5 of the first example. Next, in step S16, the forming of the third intermediate layer 7 and the depositing of the fourth information signal layer 8 (L3 layer) is performed in the same manner as step S6 of the first example.

Next, in step S17, the forming of the cover layer 9 is performed in the same manner as step S7 of the first example. Finally, in step S18, the recording of the BCA mark is performed in the same manner as step S8 of the first example.

Due to the process above, it is possible to obtain the optical information recording medium shown in FIG. 1.

EXAMPLES

Below, the present disclosure will be described in a specific manner using examples, but the present disclosure is not limited only to these examples. Below, the mixture of four metal oxides of tungsten oxide, palladium oxide, copper oxide, and zinc oxide is referred to as "WZCPO".

Example 1

First, a polycarbonate substrate with a diameter φ of 120 mm and a thickness of 1.1 mm was formed using an injection molding device. Next, the substrate which has been formed was transported from the injection molding device to a first single wafer sputtering device.

Next, the first information signal layer (L0 layer) which has the composition and the film thickness below was sequentially laminated on the substrate surface using a magnetron sputtering method. Due to this, the first information signal layer (L0 layer) was formed on the substrate surface.

First information signal layer (L0 layer)
Second protective layer
Material: ITO
Thickness: 8 nm
Inorganic recording film layer
Material: WZCPO
Thickness: 32 nm
First protective layer
Material: ITO
Thickness: 8 nm Next, the substrate where the first information signal layer is formed was transported from the first single wafer sputtering device to the barrier layer forming sputtering device. Next, after the inner circumference portion and the outer circumference portion on the rear surface of the substrate were respectively covered by an inner circumference mask with an inner diameter of 46 mm and an outer circumference mask with an outer diameter of 115 mm, a barrier layer with a thickness of 10 nm which is formed from TiN was formed on the rear surface of the substrate using a magnetron sputtering method. Due to this, the start position at the inner circumference side of the barrier layer formation region with an annular shape was set with a radius of 23 mm.

Next, the substrate was transported from the barrier layer forming sputtering device to the intermediate layer forming device and an ultraviolet curable resin (product name SK520 manufactured by Sony Chemical & Information Device Corporation) was coated uniformly on the first information signal layer using a spin coating method. After that, a concave and convex pattern of a stamper was pressed with regard to the ultraviolet curable resin which was coated uniformly on the first information signal layer and the stamper was separated after irradiating the ultraviolet curable resin with the ultraviolet rays and curing thereof. Due to this, the first intermediate layer with a thickness of 15.5 μm was formed.

Next, the substrate was transported from the intermediate layer forming device to a second single wafer sputtering device. Next, the second information signal layer (L1 layer) which has the composition and the film thickness below was sequentially laminated on the intermediate layer using a magnetron sputtering method. Due to this, the second information signal layer was formed on the first intermediate layer.

Second information signal layer (L1 layer)
Second protective layer
Material: ITO
Thickness: 8 nm
Inorganic recording film layer
Material: WZCPO
Thickness: 40 nm
First protective layer
Material: ITO
Thickness: 7 nm Next, the substrate was transported from the second single wafer sputtering device to the intermediate layer forming device and an ultraviolet curable resin (product name SK520 manufactured by Sony Chemical & Information Device Corporation) was coated uniformly on the second information signal layer using a spin coating method. After that, a concave and convex pattern of a stamper was pressed with regard to the ultraviolet curable resin which was coated uniformly on the second information signal layer and the stamper was separated after irradiating the ultraviolet curable resin with the ultraviolet rays and curing thereof. Due to this, the second intermediate layer with a thickness of 19.5 μm was formed.

Next, the substrate was transported from the intermediate layer forming device to a third single wafer sputtering device. Next, the third information signal layer (L2 layer) which has the composition and the film thickness below was sequentially laminated on the second intermediate layer using a magnetron sputtering method. Due to this, the third information signal layer was formed on the second intermediate layer.

Third information signal layer (L2 layer)
Second protective layer
Material: SIZ
Thickness: 24 nm
Inorganic recording film layer
Material: WZCPO
Thickness: 35 nm
First protective layer
Material: ITO
Thickness: 10 nm Next, the substrate was transported from the third single wafer sputtering device to the intermediate layer forming device and an ultraviolet curable resin (product name SK520 manufactured by Sony Chemical & Information Device Corporation) was coated uniformly on the third information signal layer using a spin coating method. After that, a concave and convex pattern of a stamper was pressed with regard to the ultraviolet curable resin which was coated uniformly on the third information signal layer and the stamper was separated after irradiating the ultraviolet curable resin with the ultraviolet rays and curing thereof. Due to this, the third intermediate layer with a thickness of 11.5 μm was formed.

Next, the substrate was transported from the intermediate layer forming device to a fourth single wafer sputtering device. Next, the fourth information signal layer (L3 layer) which has the composition and the film thickness below was sequentially laminated on the third intermediate layer using a magnetron sputtering method. Due to this, the fourth information signal layer was formed on the third intermediate layer.

Fourth information signal layer (L3 layer)
Second protective layer
Material: SIZ
Thickness: 31 nm
Inorganic recording film layer
Material: WZCPO
Thickness: 35 nm
First protective layer
Material: SIZ
Thickness: 10 nm Next, the substrate was transported from the fourth single wafer sputtering device to a spin coating device and an ultraviolet curable resin was coated on the fourth information signal layer using a spin coating method and a cover layer with a thickness of 53.5 μm was formed by ultraviolet rays being irradiated with regard to the ultraviolet curable resin. After that, laser light was irradiated from the rear surface side of the substrate with regard to the first information signal layer and the recording of the BCA mark was performed in the BCA (a region with an annular shape where r is 21 mm to 22 mm)

Due to the above, it was possible to obtain the optical information recording medium which is the aim.

Example 2

Other than the inner diameter of the inner circumference mask being set to 48 mm and the start position at the inner circumference side of the barrier layer forming region with an annular shape being set with a radius r of 24 mm, an optical information recording medium was obtained in the same manner as the example 1.

Example 3

Other than the inner diameter of the inner circumference mask being set to 50 mm and the start position at the inner circumference side of the barrier layer forming region with an annular shape being set with a radius r of 25 mm, an optical information recording medium was obtained in the same manner as the example 1.

Example 4

Other than the inner diameter of the inner circumference mask being set to 52 mm and the start position at the inner circumference side of the barrier layer forming region with an annular shape being set with a radius r of 26 mm, an optical information recording medium was obtained in the same manner as the example 1.

Example 5

Other than the inner diameter of the inner circumference mask being set to 54 mm and the start position at the inner circumference side of the barrier layer forming region with an annular shape being set with a radius r of 27 mm, an optical information recording medium was obtained in the same manner as the example 1.

Example 6

Other than the inner diameter of the inner circumference mask being set to 56 mm and the start position at the inner circumference side of the barrier layer forming region with an annular shape being set with a radius r of 28 mm, an optical information recording medium was obtained in the same manner as the example 1.

Example 7

Other than the inner diameter of the inner circumference mask being set to 58 mm and the start position at the inner circumference side of the barrier layer forming region with an annular shape being set with a radius r of 29 mm, an optical information recording medium was obtained in the same manner as the example 1.

Example 8

First, a polycarbonate substrate with a diameter φ of 120 mm and a thickness of 1.1 mm was formed using an injection molding device.

Next, the substrate which has been formed was transported from the injection molding device to a barrier layer forming sputtering device. Next, after the inner circumference portion and the outer circumference portion on the rear surface of the substrate were respectively covered by an inner circumference mask with an inner diameter of 46 mm and an outer circumference mask with an outer diameter of 118 mm, a barrier layer with a thickness of 10 nm which is formed from TiN was formed on the rear surface of the substrate using a magnetron sputtering method. Due to this, the start position at the inner circumference side of the barrier layer formation region with an annular shape was set with a radius of 23 mm.

Next, the substrate where the barrier layer has been formed was transported from the barrier layer forming sputtering device to a first single wafer sputtering device.

Next, the first information signal layer which has the composition and the film thickness below was sequentially laminated on the rear surface of the substrate using a magnetron sputtering method. Due to this, the first information signal layer (L0 layer) was formed on the rear surface of the substrate.

First information signal layer (L0 layer)
Second protective layer
Material: ITO
Thickness: 8 nm
Inorganic recording film layer
Material: WZCPO
Thickness: 32 nm
First protective layer
Material: ITO
Thickness: 8 nm After this, in the same manner as the example 1, the first intermediate layer, the second information signal layer, the second intermediate layer, the third information signal layer, the third intermediate layer, the fourth information signal layer, and the cover layer were sequentially formed, and after this, the recording of the BCA mark was performed. Due to the above, an optical information recording medium was obtained.

Comparative Example 1

Other than the inner diameter of the inner circumference mask being set to 34 mm and the start position at the inner circumference side of the barrier layer forming region with an annular shape being set with a radius r of 17 mm, an optical information recording medium was obtained in the same manner as the example 1.

Comparative Example 2

Other than the inner diameter of the inner circumference mask being set to 36 mm and the start position at the inner circumference side of the barrier layer forming region with an annular shape being set with a radius r of 18 mm, an optical information recording medium was obtained in the same manner as the example 1.

Comparative Example 3

Other than the inner diameter of the inner circumference mask being set to 38 mm and the start position at the inner circumference side of the barrier layer forming region with an annular shape being set with a radius r of 19 mm, an optical information recording medium was obtained in the same manner as the example 1.

Comparative Example 4

Other than the inner diameter of the inner circumference mask being set to 40 mm and the start position at the inner circumference side of the barrier layer forming region with an annular shape being set with a radius r of 20 mm, an optical information recording medium was obtained in the same manner as the example 1.

Comparative Example 5

Other than the inner diameter of the inner circumference mask being set to 42 mm and the start position at the inner circumference side of the barrier layer forming region with an annular shape being set with a radius r of 21 mm, an optical information recording medium was obtained in the same manner as the example 1.

Comparative Example 6

Other than the inner diameter of the inner circumference mask being set to 44 mm and the start position at the inner circumference side of the barrier layer forming region with an annular shape being set with a radius r of 22 mm, an optical information recording medium was obtained in the same manner as the example 1.

Comparative Example 7

Other than the barrier layer not being formed on the rear surface of the substrate, an optical information recording medium was obtained in the same manner as the example 1.

Comparative Example 8

Other than the forming process of the barrier layer being performed after the forming of the cover layer, an optical information recording medium was obtained in the same manner as the comparative example 1.

(Evaluation)

The optical information recording media of the example 1 to the example 8 and the comparative example 1 to 8 which were obtained as described above were evaluated as below.

(Recording Sensitive Degradation)

In the recording and reproduction of the optical information recording media, the i-MLSE value of the fourth information signal layer was measured by 1-7 modulated data with a 32 GB density per layer being recorded and reproduced with a NA=0.85, a recording wavelength of 405 nm, and a recording line speed of 7.69 m/s using a disc tester (product name ODU-1000 manufactured by Pulstec Industrial Co., Ltd.). Here, i-MLSE is a signal evaluation index which is equivalent to a jitter which was used in the past in high-density recording and reproduction, and the signal characteristics are better when the value is lower. When the recording power when the i-MLSE value is at its lowest is $Pwo_1$ and the recording power when the i-MLSE value is at its lowest after 200 hours of storage in an environment with 80° C. and 85% RH which is an accelerated condition of durability is $Pwo_2$, the standardization of the recording power shift amount of the $Pwo_2$ using $Pwo_1$ is the recording sensitive degradation. That is, it is regulated by equation (1) described below in a case where the recording sensitive degradation before and after the storage environment is set as $\Delta$.

$$\Delta = (Pwo_2 - Pwo_1)/Pwo_1 \qquad (1)$$

(Sudden Change Characteristics)

The release of water from the optical information recording medium and each heat expansion interact in a complex manner and the warping (R-skew) of the optical information recording medium changes. In order to evaluate this, Temp Shock characteristics and Hum Shock characteristics were evaluated as below. Here, evaluation was performed using good, fail, and average as reference values since the change amount has a product specification which is within ±0.15 degrees.

If the optical information recording medium is designed with a change amount which exceeds the product specification of ±0.15 degrees, there is a possibility that the optical information recording medium is generated during production where the warping of the optical information recording medium is large and the servo during recording and reproduction is removed, and when extreme, touches the pickup when used where there is a sudden change in environment (that is, when there is a sudden change).

(Temp Shock Characteristics)

The optical information recording medium, which is put in a thermostatic chamber in an environment where the temperature is 25° C. and the humidity is 45%, was moved to a thermostatic chamber where the temperature is 55° C. and the humidity is 9%. The change amount of the warping (R-skew) of the optical information recording medium after the move at this time was confirmed with the warping (R-skew) of the optical information recording medium of the optical information recording medium before the move as a standard.

(Hum Shock Characteristics)

The optical information recording medium, which is put in a thermostatic chamber in an environment where the temperature is 25° C. and the humidity is 90%, was moved to a thermostatic chamber where the temperature is 25° C. and the humidity is 45%. The change amount of the warping (R-skew) of the optical information recording medium after the move at this time was confirmed with the warping (R-skew) of the optical information recording medium of the optical information recording medium before the move as a standard.

Figure 7:
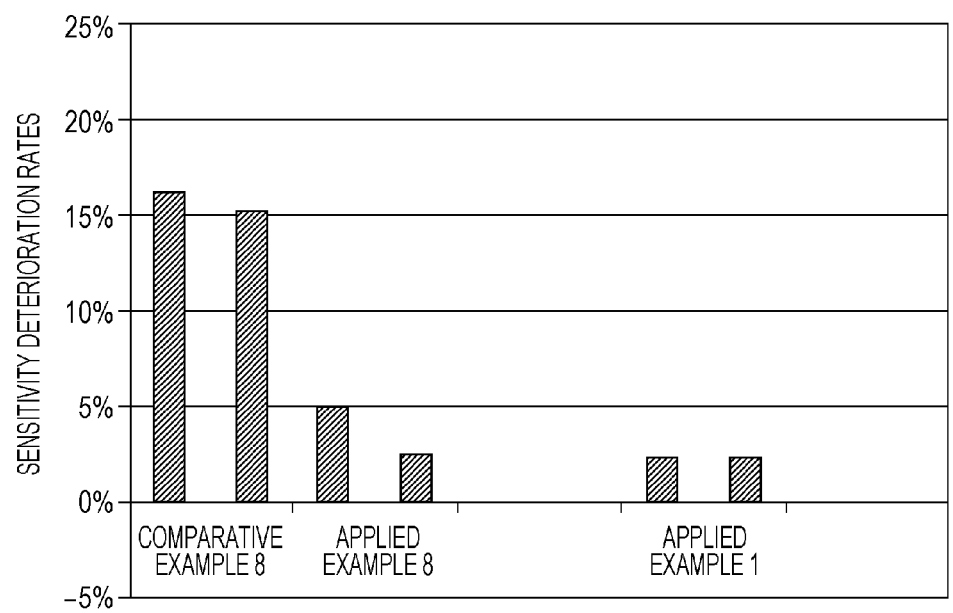
FIG. 7 is a graph which brings together measurement results on recording sensitivity deterioration rates.

A bar graph which brings together the evaluations of the recording sensitive degradation of the example 1, the example 8, and the comparative example 8 is shown in FIG. 7. Here, the bar graph of FIG. 7 brings together the results where measurement with two samples was performed with regard to each of the example 1, the example 8, and the comparative example 8.

As shown in FIG. 7, in the comparative example 8 where the forming process of the barrier layer was performed after the forming of the cover layer, the recording sensitive degradation was larger compared to the example 1 where the forming of the barrier was performed after the forming of the first information signal layer and before the forming of the first intermediate layer and the example 8 where the forming of the barrier was performed after the forming of the substrate 1 and before the forming of the first information signal layer.

Figure 8A:
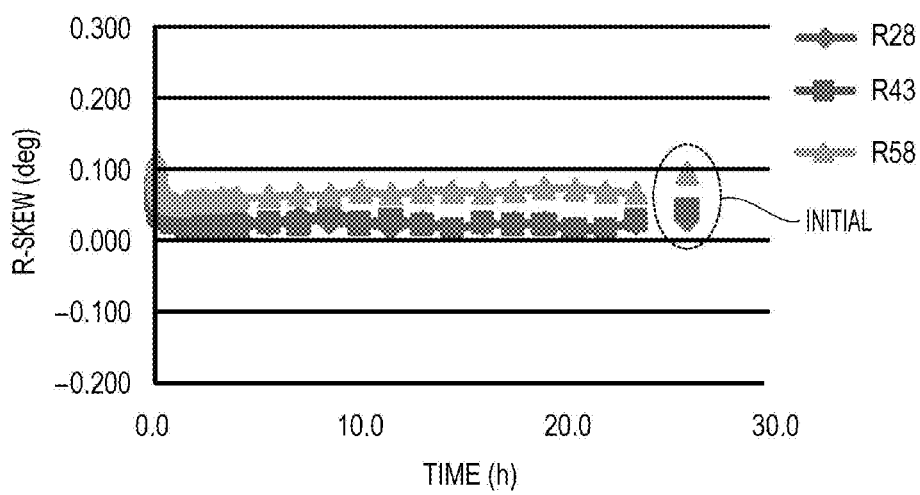
FIGS. 8A and 8B are graphs illustrating measurement results of a sudden change characteristic of an example 1.
Figure 8B:
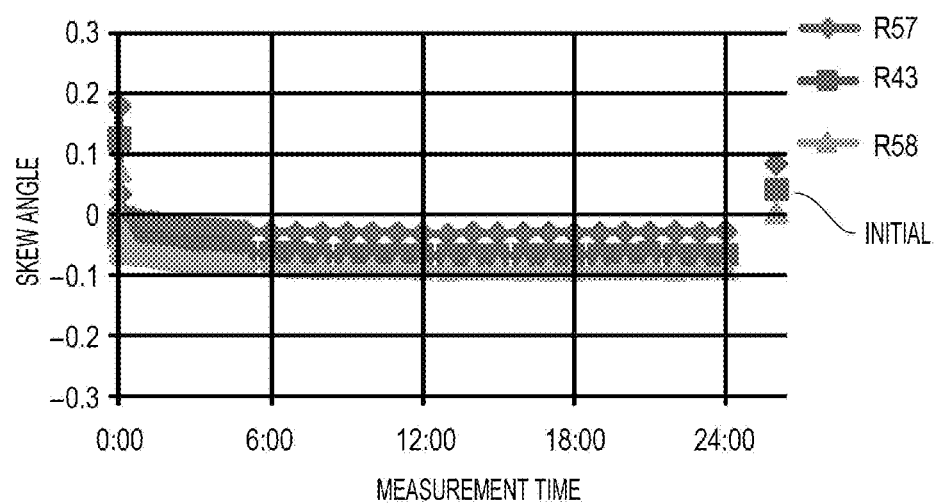
Figure 9A:
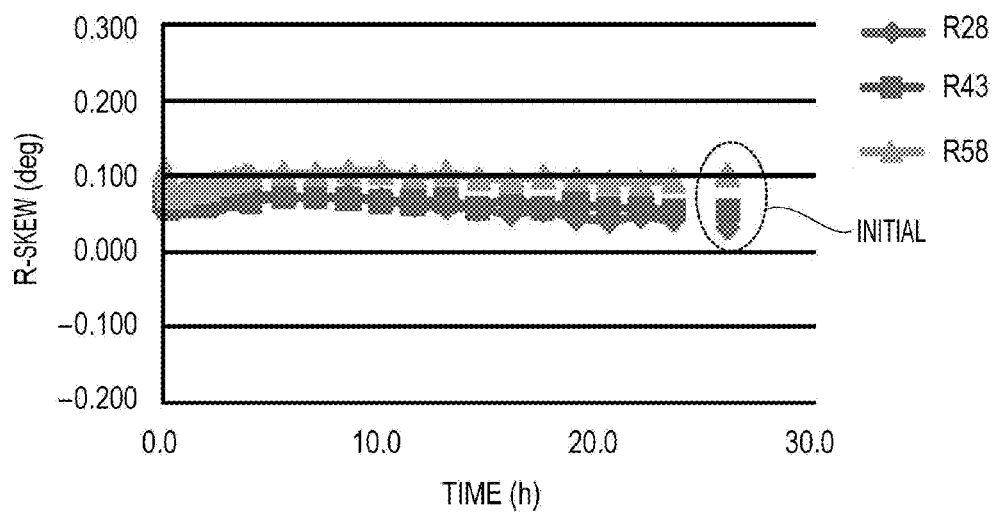
FIGS. 9A and 9B are graphs illustrating measurement results of a sudden change characteristic of a comparative example 1.
Figure 9B:
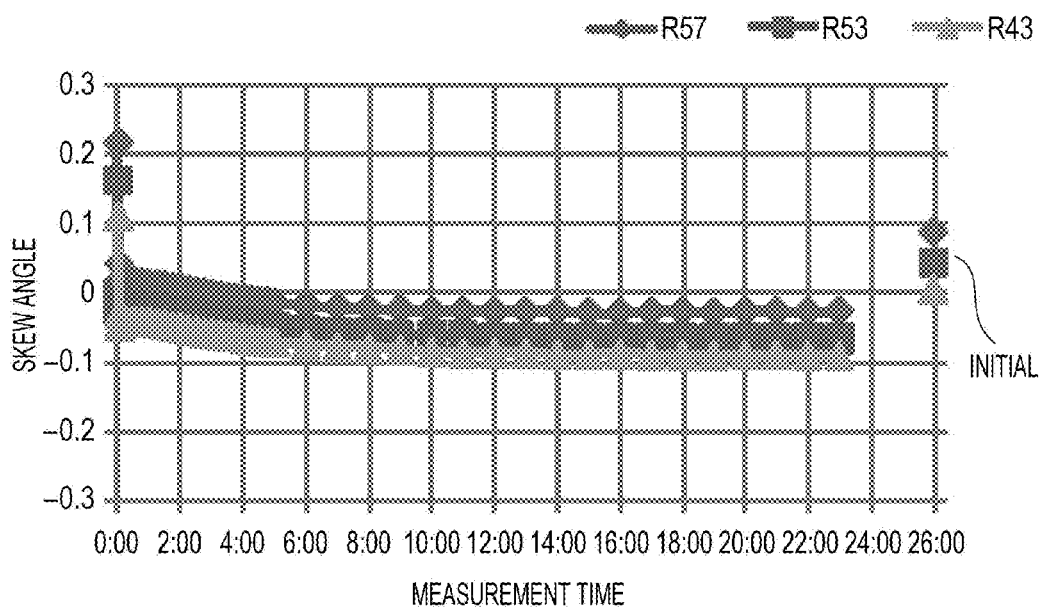
Figure 10A:
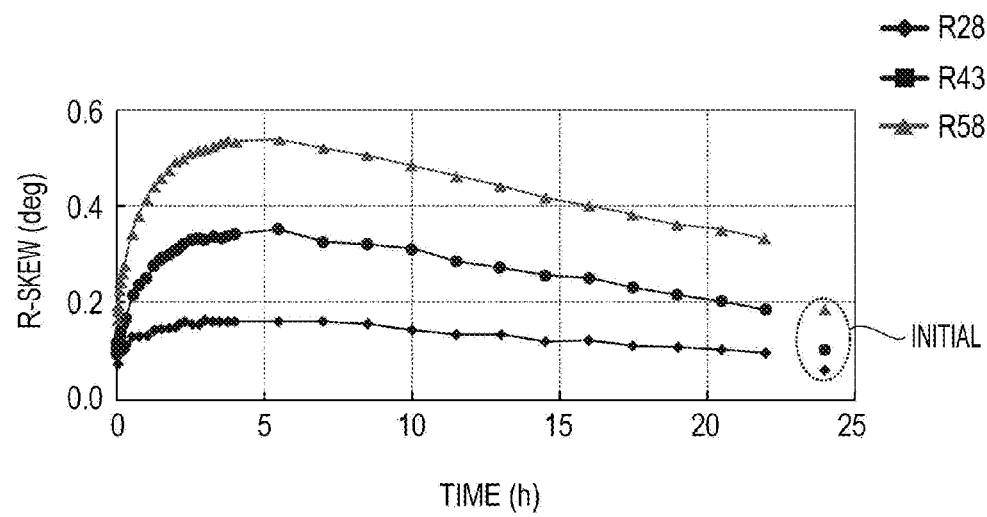
FIGS. 10A and 10B are graphs illustrating measurement results of a sudden change characteristic of a comparative example 7.
Figure 10B:
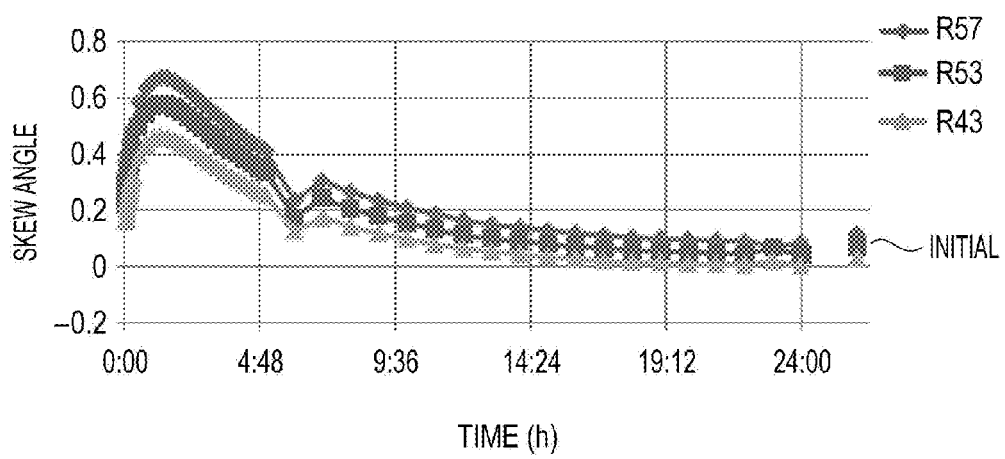

Graphs which bring together the measurement results of the sudden change characteristics of the example 1 are shown in FIGS. 8A and 8B. Temp Shock characteristics are shown in FIG. 8A and Hum Shock characteristics are shown in FIG. 8B. Graphs which bring together the measurement results of the sudden change characteristics of the comparative example 1 are shown in FIGS. 9A and 9B. Temp Shock characteristics are shown in FIG. 9A and Hum Shock characteristics are shown in FIG. 9B. Graphs which bring together the measurement results of the sudden change characteristics of the comparative example 7 are shown in FIGS. 10A and 10B. Temp Shock characteristics are shown in FIG. 10A and Hum Shock characteristics are shown in FIG. 10B. Here, the numerical values of the R28, R54, and R58 in FIG. 8A indicate the measurement position (distance from the center of one main surface of the substrate) and R57, R53, and R43 in FIG. 8B indicate measurement positions in the same manner. In addition, the value which is shown by the mark which is initially shown indicates the initial value before the move. (FIGS. 9A and 9B and FIGS. 10A and 10B are the same).

If the graphs in FIGS. 8A to 9B are compared, it is possible to confirm that there is no difference in the sudden change characteristics due to a difference in the forming region of the barrier layer. Accordingly, it is understood from the point of the sudden change characteristics that the starting position of the forming region of the barrier layer may be the outer side of the BCA. On the other hand, if the graphs in FIGS. 8A to 9B are compared, it is possible to confirm that the sudden change characteristics deteriorate in a case where the barrier layer is not formed.

Next, a gathering of the evaluations of the sudden change characteristics, the presence or absence of the BCA recording, and the recording sensitivity degradation of the example 1 to the example 7 and the comparative example 1 and the comparative example 7 are shown in Table 1.

In Table 1, the presence of the BCA has the meaning that the recording of the BCA mark was possible in the same recording conditions (laser power, number of rotations, and the like) as the recording of the BCA mark in a case where the barrier layer is not formed. The absence of the BCA has the meaning that the BCA mark is not able to be recorded in the conditions described above.

In addition, the recording sensitive degradation was evaluated as good, average, fail with a standard of being 5% or less. Having 5% or less as the standard is due to the reason below.

That is, it is necessary to recording using the optimum recording power in the recording with excellent data, but there is a range where data is able to be recorded in a comparatively excellent manner even if the recording power slightly deviates and this is typically referred to as a power margin width. The power margin width is often secured to be ±5% or more at a minimum in the design of the optical information recording medium. Due to this, the upper limit of the excellent range is set at 5% in consideration of ±5% which is the worst case. That is, when recording using recording power which is stored in an information area of the optical information recording medium in advance, even if it is excellent since there is no deviation before the storage environment, writing of the data becomes difficult due to insufficient recording power when the recording sensitivity after the storage environment is significantly deviated so as to exceed the power margin. As such, the upper limit of the recording sensitivity degradation is set as 5%.

forming of the first information signal layer since the barrier layer is also formed in the BCA.

2. Other Embodiments

The present disclosure is not limited to the embodiment of the present disclosure described above and various modifications and application are possible within the range which does not depart from the scope of the present disclosure. For example, in the embodiment and the examples described above, a case where the present disclosure has been applied with regard to the recordable optical information recording medium has been described as an example, but the present disclosure is not limited to these examples and is able to also be applied to the optical information recording media which are reproduction-only types or types where rewriting is possible. In addition, in the embodiment described above, a case where the optical information recording medium is provided

TABLE 1

|  | Barrier Layer Start Position | Presence of Absence of BCA | Hum Shock/Tem Shock (Change Amount [deg]) | Hum Shock/Tem Shock (Evaluation) | Sensitivity Degradation | Sensitivity Degradation (Evaluation) |
|---|---|---|---|---|---|---|
| Example 1 | r = 23 mm | Present | −0.01/+0.12 | good | 2.6% | good |
| Example 2 | r = 24 mm | Present | −0.00/+0.12 | good | 2.5% | good |
| Example 3 | r = 25 mm | Present | +0.01/+0.13 | average | 3.0% | average |
| Example 4 | r = 26 mm | Present | +0.02/+0.14 | average | 4.0% | average |
| Example 5 | r = 27 mm | Present | +0.04/+0.15 | average | 5.0% | average |
| Example 6 | r = 28 mm | Present | +0.06/+0.16 | fail | 6.0% | fail |
| Example 7 | r = 29 mm | Present | +0.08/+0.20 | fail | 8.0% | fail |
| Comparative Example 1 | r = 17 mm | Absent | −0.04/+0.11 | good | 2.5% | good |
| Comparative Example 2 | r = 18 mm | Absent | −0.04/+0.11 | good | 2.5% | good |
| Comparative Example 3 | r = 19 mm | Absent | −0.04/+0.12 | good | 2.5% | good |
| Comparative Example 4 | r = 20 mm | Absent | −0.04/+0.11 | good | 2.5% | good |
| Comparative Example 5 | r = 21 mm | Absent | −0.03/+0.12 | good | 2.5% | good |
| Comparative Example 6 | r = 22 mm | Absent | −0.02/+0.11 | good | 2.6% | good |
| Comparative Example 7 | No barrier | Present | +0.35/+0.56 | fail | 16% | fail |

As shown in Table 1, in the example 1 to the example 7, since the start position at the inner circumference side of the barrier layer forming region with an annular shape is at an outer side of the BCA, it is possible to appropriately perform the recording of the BCA mark even in a case where the barrier layer is formed after the forming of the substrate and before the forming of the first information signal layer. In addition, in the example 1 to the example 5, the sudden change characteristics and the recording sensitivity degradation characteristics are good or normal or better, and in the example 1 and the example 2, the sudden change characteristics and the recording sensitivity degradation characteristics are good. That is, it is understood that it is preferable that the start position at the inner circumference side of the barrier layer forming region with an annular shape is a position where the radius r exceeds 22 mm and is less than 28 mm, a position where the radius r exceeds 22 mm and is less than 25 mm is more preferable, and a position where the radius r is 23 mm or more and 24 mm or less is even more preferable. On the other hand, in the comparative example 1 to the comparative example 6, the recording of the BCA mark is not able to be appropriately performed in a case where the barrier layer is formed after the forming of the substrate and before the with four layers of information signal layers has been described as an example, but the number of layer of the information signal layers is not limited to this and it is possible for the information signal layers to be an arbitrary number of layers which are two or more.

In the embodiment described above, a case where the present disclosure is applied with regard to the optical information recording medium, which has a configuration where two or more information signal layers and the optically transparent layer are laminated on the substrate in this order and which performs recording or reproduction of the information signal by laser light being irradiated on the information signal layer from the optically transparent layer side, has been described as an example, but the present disclosure is not limited to this example. For example, the present disclosure is able to be applied also with regard to the optical information recording medium which has a configuration where two or more information signal layers and a protective layer are laminated on the substrate in this order and which performs recording or reproduction of the information signal by laser light being irradiated on the two or more information signal layers from the substrate side or an optical information recording medium which has a configuration where two or more information signal layers are provided between two substrate and which performs recording or reproduction of the information signal by laser light being irradiated on the information signal layer from one substrate side.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A manufacturing method of an optical information recording medium comprising:
    forming a substrate which has a first main surface and a second main surface;
    forming a first information signal layer on the first main surface of the substrate;
    forming an intermediate layer on the first information signal layer;
    forming a second information signal layer on the intermediate layer;
    irradiating light from the second main surface side of the substrate and recording identification information on a first region out of the first region and a second region; and
    forming a barrier layer with regard to the second main surface in the second region which excludes the first region in plan view where the identification information is to be recorded before the recording of the identification information.

2. The manufacturing method of an optical information recording medium according to claim 1,
    wherein the first region is an annular region, and
    the second region is an annular region which is on an outer circumference side of the first region.

3. The manufacturing method of an optical information recording medium according to claim 2,
    wherein the first region is a region which is 21 mm or more and 22 mm or less from the center of the second main surface.

4. The manufacturing method of an optical information recording medium according to claim 3,
    wherein a start position at an inner circumference side of the second region is 22 mm further to an outer circumference side from the center of the second main surface.

5. The manufacturing method of an optical information recording medium according to claim 4,
    wherein the start position at an inner circumference side of the second region is 25 mm further to an inner circumference side from the center of the second main surface.

6. The manufacturing method of an optical information recording medium according to claim 1, further comprising:
    forming one or more information signal layers after the forming of the second information signal layer and before the recording of the identification information.

7. The manufacturing method of an optical information recording medium according to claim 1,
    wherein the forming of the barrier layer is performed after the forming of the substrate and before the forming of the first information signal layer.

8. The manufacturing method of an optical information recording medium according to claim 1,
    wherein the forming of the barrier layer is performed after the forming of the first information signal layer and before the forming of the second information signal layer.

9. An optical information recording medium comprising:
    a substrate which has a first main surface and a second main surface;
    one or a plurality of information signal layers which are formed on the first main surface of the substrate, where identification information is recorded; and
    a barrier layer which is formed on the second main surface,
    wherein the barrier layer is formed in a second region which excludes a first region in plan view where the identification information is to be recorded.

10. The optical information recording medium according to claim 9,
    wherein the first region is an annular region, and
    the second region is an annular region which is on an outer circumference side of the first region.

11. The optical information recording medium according to claim 10,
    wherein the first region is a region which is 21 mm or more and 22 mm or less from the center of the second main surface.

12. The optical information recording medium according to claim 11,
    wherein a start position at an inner circumference side of the second region is 22 mm further to an outer circumference side from the center of the second main surface.

13. The optical information recording medium according to claim 12,
    wherein the start position at an inner circumference side of the second region is 25 mm further to an inner circumference side from the center of the second main surface.

* * * * *